United States Patent

[11] 3,624,712

| [72] | Inventor | Frederick G. Weighart<br>Brookfield, Conn. |
|---|---|---|
| [21] | Appl. No. | 843,301 |
| [22] | Filed | July 22, 1969 |
| [45] | Patented | Nov. 30, 1971 |
| [73] | Assignee | Automation Industries, Inc.<br>Century City, Calif. |

[54] ULTRASONIC PULSE ECHO THICKNESS-MEASURING DEVICE
5 Claims, 2 Drawing Figs.

[52] U.S. Cl. .................................................. 73/67.9
[51] Int. Cl. .................................................. G01N 29/04
[50] Field of Search .......................... 73/67.7–67.9,
290 U; 324/189, 190, 191

[56] References Cited
UNITED STATES PATENTS

| 3,048,031 | 8/1962 | Beaujard et al. ............... | 73/67.9 X |
| 3,147,613 | 9/1964 | Kirkhope ........................ | 73/67.7 |
| 3,276,249 | 10/1966 | King ............................... | 73/67.9 X |
| 3,427,866 | 2/1969 | Weighart ........................ | 73/67.9 X |
| 3,485,087 | 12/1969 | Brech ............................. | 73/69 X |

*Primary Examiner* — Richard C. Queisser
*Assistant Examiner* — Arthur E. Korkosz
*Attorney* — Dan R. Sadler ABSTRACT: An ultrasonic thickness-measuring instrument having a dual transducer search unit wherein a transmitter-receiver transducer and a receiver transducer are mounted at an angle to provide overlapping beam patterns below the workpiece surface and are recessed to provide a fixed time delay. The transmitter-receiver transducer measures the distance to the surface, and the receiver transducer measures the distance to the back surface. The input of a receiver and ramp generator is alternately connected to each of the transducers, and the ramp function outputs are alternately connected to peak detectors to give two signals representative of the distance to the front surface and to the rear surface of the workpiece. The two signals are applied to a difference amplifier, and the difference output is digitized to provide a digital representation of workpiece thickness.

ULTRASONIC PULSE ECHO THICKNESS-MEASURING DEVICE

BACKGROUND OF THE INVENTION

1. Field of the Invention

The present invention relates to nondestructive testing means, and more particularly to an ultrasonic nondestructive testing device for measuring thickness, particularly of thin bodies.

2. Description of the Prior Art

In the prior art one means of determining or measuring the thickness of a workpiece is to transmit the ultrasonic energy into the workpiece and measure the amount of time required for the ultrasonic energy to travel from the front face of the workpiece to the rear face and return to the front face. In one form of test a combination transducer is employed which is capable of both transmitting the energy and receiving the echoes. With an arrangement of this nature a very large signal is fed to the receiver at the time of transmission. The receiver must be very sensitive to receive the small signals produced by the echoes. As a result the receiver is blocked for a substantial period of time following the transmission of an initial pulse. It is sometimes virtually impossible to detect an echo occurring during the period the receiver is blocked. As a result an ultrasonic testing system employing a single transducer cannot reliably detect signals that are very close to the transducer, and thus impair the thickness measuring of the workpiece.

In order to overcome this difficulty and permit the measuring of thin workpieces, it has been proposed to separate the transducer from the workpiece and thereby introduce a time delay which is adequate to allow a recovery of the receiver before any echoes are received. The distance between the front surface and the rear surface of a workpiece is then determined by measuring the time between the echo resulting from the interface formed on the entrant surface and echo from the rear surface. Such an arrangement is not convenient, since it normally requires immersing the transducer and the workpiece in a liquid bath or providing some large and bulky delay means as a couplant. Also it requires some form of gating to detect the echoes which are produced at the interface.

Further, the above disadvantages are overcome by providing a search unit having a pair of separate transducers acoustically isolated from each other. This type of unit is placed directly on the surface of the workpiece whereby the first transducer transmits the ultrasonic energy directly into the workpiece and a second transducer receives the echoes. This arrangement permits a high degree of isolation between the receiver and the transmitted energy, whereby the tendency for the receiver to be blocked is greatly reduced or eliminated. The receiver can thereby be very sensitive and also have a sufficient short recovery time to sense echoes occurring immediately after the transmitted pulse. The two transducers are laterally spaced from each other so as to lie flat on the surface of the workpiece. Accordingly the range of the target or thickness is determined by measuring the time between the transmitted pulse and the echo. However, since the transducers have been parallel to each other, the beam patterns have also been parallel and nonoverlapping at close ranges. As a result it has been difficult to resolve targets that are not at sufficient range to be in overlapping portions of the two beam patterns.

To overcome this difficulty, the transducers are separated from the workpiece, whereby the beam pattern overlaps the region of the rear surface of the workpiece. Since the receiving transducer is isolated from the transmitting transducer, there is very little if any signal produced in the receiver corresponding to the transmission of the ultrasonic energy and/or a reflection from the entrance of the energy into the workpiece. As a consequence, it has been difficult to correlate the receiving time with the transmission. Accordingly it has heretofore been necessary to display the signals on a cathode-ray oscilloscope and rely on the operator's ability to manually, accurately interpret the display for each measurement.

These foregoing difficulties have been overcome in U.S. Pat. No. 3,427,866 issued to Frederick G. Weighart, the present inventor of this invention, and assigned to Automation Industries, Inc., the assignee of the present invention. In this patent, a small compact ultrasonic tester was provided for measuring the thicknesses of very thin workpieces. This is accomplished by providing an ultrasonic system having a search unit with a pair of acoustically isolated transducers which are adapted to be spaced from the surface of the workpiece with their beam patterns overlapping each other at a range which is very close to the front surface of the workpiece. Also very simple means are provided for accurately and continuously measuring the flight time of the ultrasonic energy through the workpiece without any manual time consuming interpretations by the operator.

Briefly, in that patent, a search unit was provided in direct contact with the surface of the material. A pair of transducers are retained in the search unit at a predetermined fixed distance from the entrant surface. At the instant the transmission of the initial pulse occurs time delay means are actuated to produce a reference signal. The reference signal is delayed by an interval equal to the flight time from the transmitting transducer to entrant surface whereby the signal occurs simultaneously with the entrance of the energy into the workpiece. The time between the reference pulse and the echo pulse is then measured to indicate the thickness. It has therefore been found the dual search unit provides the highest sensitivity capability and the best resolution capability. Its use imposes some circuitry problems, such as the requirement for extremely stable time delay means. The desirability of resolving thicknesses on the order of 0.02 in. imposes even greater burdens on the instrumentation. It is the purpose of the present invention to overcome the limitations of the prior art methods in a way which is accurate, noncritical, and yet inexpensive.

Some of the prior art methods used such as that set forth in the above patent, comprise a dual search unit, a delay generator, and a means for measuring the time between the end of the delay and the occurrence of echo. There are disadvantages in these systems in that the delay must be ultrastable. For example, a 1-percent drift of a delay time would cause a 7-percent error in measuring 0.1 in. thickness, and a 35-percent error in measuring 0.020-in. thickness. Further, any temperature change in the search unit itself causes an error due to thermal expansion, since measurement is in effect from the time of main bang. Further, the thickness measuring devices of this method requires a gate and ramp of $0.2\mu$ in duration and a rise time on the order of 10 nsec. for a 0.020-in. thickness measurement. Thinner sections become even more difficult. A further prior art method which is used to overcome the disadvantages of the aforesaid instrumentation when used with a dual search unit, comprises two separate and independent receivers. The first receiver is connected to the transmit crystal and amplifies the echo from the interface between search units used and test piece. The second receiver is connected to the receiver crystal and amplifies the gate from the far side of the test piece. The video from the first receiver turns the gate ON, and the video from the second receiver turns the gate OFF. A gated ramp generator and a peak detector provide a DC voltage proportional to the thickness of the test piece. This prior art method has the advantage of being inherently temperature compensated for search unit temperatures, since the time for both signals is equally effective. It also does not require an ultrastable delay as in the previously mentioned method. But the disadvantage of this method is that two complete, independent receivers are required and if used for measurement of very thin bodies, it is very demanding of circuit speed and accuracy, as is the previous method.

A further prior art method is a type which measures the time between multiple echoes within the material. It has the advantage of being unaffected by search unit temperature changes and of using simple, conventional circuitry. But it has disadvantages in that the high sensitivity capability of the dual search unit is sacrificed due to the requirement for multiple echoes. The high resolution capability of the dual search unit is sacrificed. The high resolution capabilities of a dual search unit is sacrificed because the multiple echoes in a dual search unit will be no more clearly resolved than multiples from a single crystal search unit.

SUMMARY

The embodiment of the present invention disclosed herein includes a pulser which energizes the transmitter of a dual search unit, generating a pulse of ultrasonic energy. The ultrasonic pulse is delayed before encountering the workpiece. Reflected pulses are similarly delayed. Pulses echoed from the interface appear on the first terminal of the input selector, and pulses reflected from the far side of the test piece appear at a second terminal. A multiplexer-type circuit selects each input at alternate test periods. This may conveniently be done by a flip-flop. These signals are then amplified in the receiver and a second flip-flop is turned ON at the same time as the pulser is actuated and turned OFF at echo time. A ramp generator operated by the second flip-flop, and a pair of peak detectors provide DC outputs proportional in amplitude to the time required for each echo on alternate periods. A difference amplifier provides a square wave which has an amplitude proportional to the difference between the two signals, provided by the peak detector, which is proportional to the thickness of the material. The difference signal is applied to an analog-to-digital converter and a clock, which is started and stopped by the converter. The clock's output is constant giving a digital indication of thickness. The advantages of such a system is that an ultrastable delay is not required as in the aforesaid prior art methods, and that only a single receiver is necessary. The search unit's temperature has no effect since it affects both inputs equally. By the employment of the present invention measurements of very thin bodies can be made, employing relatively slow operating circuits, since a period of approximately 4 to 7$\mu$ must be measured, instead of the 0.2$\mu$ as in the case of the prior art. Finally, the circuit stability as herein described is not highly critical, since a 1-percent error in the ramp generator or peak detector does not get multiplied, but results in only a 1-percent error thickness.

BRIEF DESCRIPTION OF THE DRAWINGS

These and other features and advantages of the present invention will become readily apparent to those skilled in the art from the following detailed description of one operative embodiment thereof when taken in connection with the accompanying drawings, wherein.

DETAILED DESCRIPTION OF THE DRAWINGS

Figure 1:
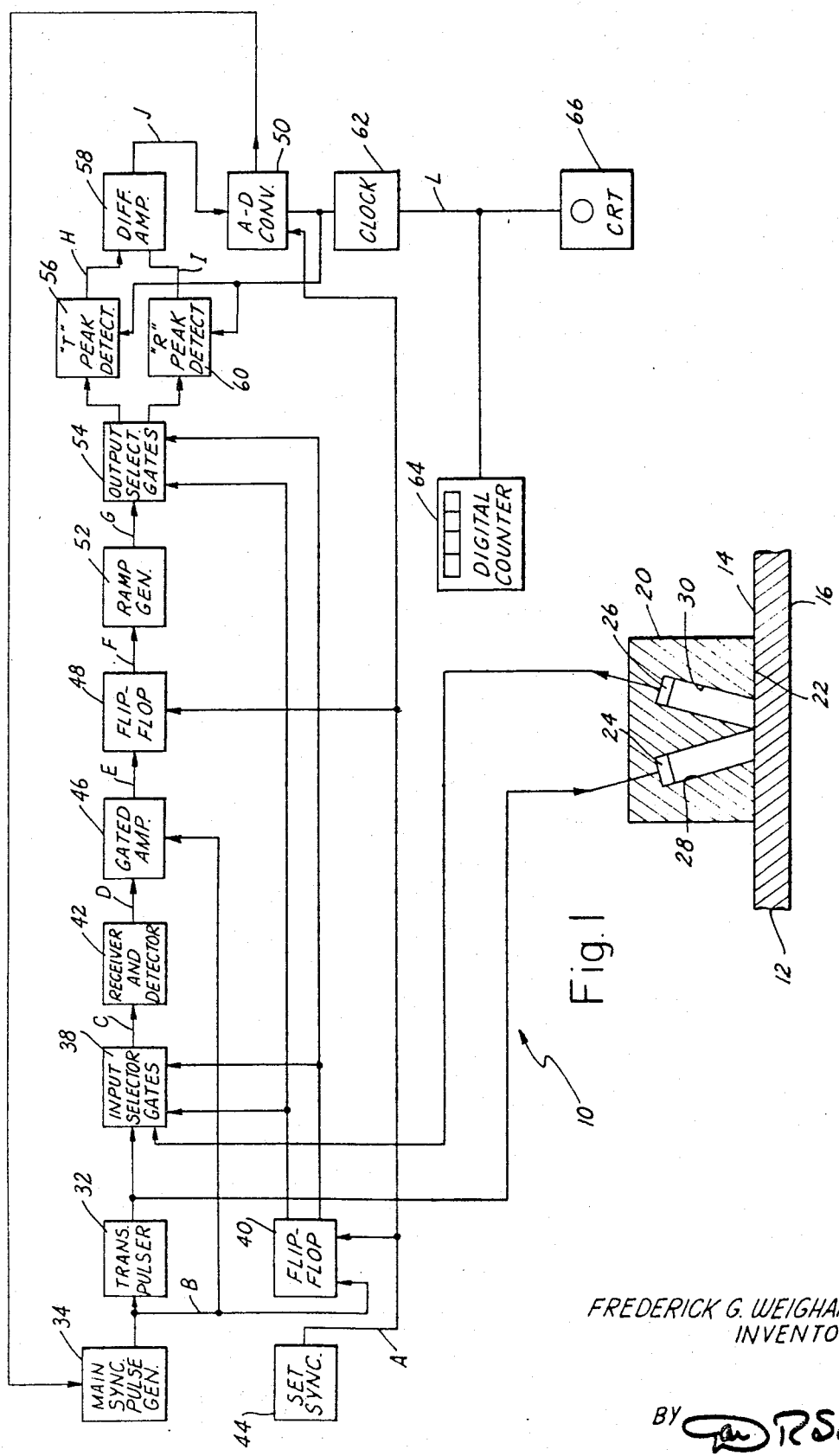
FIG. 1 is a block diagram of a thickness gage and a search unit embodying one form of this invention.

Referring to the drawings in more detail the present invention is particularly adapted to be embodied in an ultrasonic nondestructive tester 10 for measuring the characteristics of a workpiece 12. Normally the workpiece 12 has a front or entrant surface 14 and a rear or back surface 16. Normally these two surfaces 14 and 16 are substantially uniformly spaced from each other and define the thickness of the material or workpiece 12. Although the tester 10 may be employed for measuring or determining a wide variety of characteristics of the workpiece 12, it is primarily useful in measuring the thickness of the workpiece 12, and variations in the thickness.

The tester 10 includes a search unit 20 which is adapted to be manually or mechanically manipulated so as to scan the workpiece 12. The search unit 20 includes a block of material having a smooth face 22 adapted to be placed in intimate contact with the entrant surface 14. A pair of transducers 24 and 26 are rigidly mounted inside the search unit 20 so as to be carried therewith. The first transducer 24 is adapted to transmit pulses of ultrasonic energy whenever an appropriate electrical signal is applied thereto. This energy is propagated primarily along a beam pattern which extends into the workpiece 12 when the search unit 20 is seated thereon.

Both transducers 24 and 26 are adapted to produce electrical signals corresponding to ultrasonic energy incident thereon. Transducer 26 also has a beam pattern in which it is most sensitive. The search unit 20 positions transducer 26 so that the echoes from the transmitted pulses reflected from within the workpiece 12 will lie within the beam pattern of the receiving transducer 26, but not echoes received from the entrant surface 14.

The search unit 20 preferably includes a material which highly attenuates ultrasonic energy. This insures the two transducers 24 and 26 being substantially completely isolated from each other. As a consequence, even though a large amount of energy may be radiated from the transducer 24, very little if any of this energy will be coupled directly into the transducer 26 and/or its accompanying receiver.

In the event it is desired to measure the thickness of a relatively thin workpiece 12, the two transducers 24 and 26 are angularly disposed relative to each other whereby the two beam patterns overlap each other at a range corresponding to that of the rear surface 16. This may be accomplished by the positioning of the two transducers 24 and 26 oblique to each other and to the face 22.

In addition it has been found desirable to recess the transducers 24 and 26 into the search unit 20. In the present instance, this is accomplished by providing a pair of passages 28 and 30 that extend inwardly into the face 22 of the search unit 20 at an angle to each other. It is to be noted that by increasing the length of the passages 28 and 30, the angle between the beam patterns may be reduced. This will be effective to increase the distance over which the pattern overlaps each other, and thereby increases the range of thicknesses that may be measured with any given search unit 20. It is also to be noted that by recessing the transducers 24 and 26 into the passages 28 and 30 in this manner, the transducers 24 and 26 may be substantially completely isolated from each other by the material in the search unit.

In order to assure an effective coupling between the transmitting and receiving transducers 24 and 26 and the entrant surface 14, the passages 28 and 30 may be filled with an acoustically transparent material, i.e., a material having a small amount of acoustical attenuation. Preferably, the acoustic impedance of the acoustically transparent material should be approximately that of the workpiece 12.

A pulser 32 is electrically coupled to the transmitting transducer 24 and provides for intermittently supplying triggering pulses thereto. Each time such a pulse is applied to the transducer 24, a pulse of ultrasonic energy is radiated from the transducer 24 through the passage 28 and into the workpiece 12. The operation of the pulser 32 is controlled by a pulse generator 34 which provides periodic synchronizing pulses. These pulses are effective to control the rate at which the pulser 32 operates and also to synchronize the operation of the various portions of the test instrument 10.

Each time the generator 34 causes the pulser 32 to excite the transducer 24, a pulse or burst of ultrasonic energy is propagated through the material in the passage 28. If the face 22 of the search unit 20 is in contact with the workpiece 12, the energy will pass through the entrant surface 14 and into the workpiece 12. It is to be noted that the transfer of the energy through the surface 14 will be delayed from the initial transmission by the flight time of the energy through passage 28.

A portion of the energy generated by transducer 24 is reflected from the entrant surface 14, and returned to transducer 24, producing an electrical signal. A portion of the energy from transducer 24 penetrates the workpiece and is reflected from rear surface 16 The energy reflected from rear surface 16 is then sent through the material in the passage 30 and carried to transducer 26 whereby another electrical signal is produced. These signals are then applied through the input selection gates 38 into the receiver and detector 42 for subsequent displaying on the readout equipment disclosed more completely hereinbelow.

Figure 2:
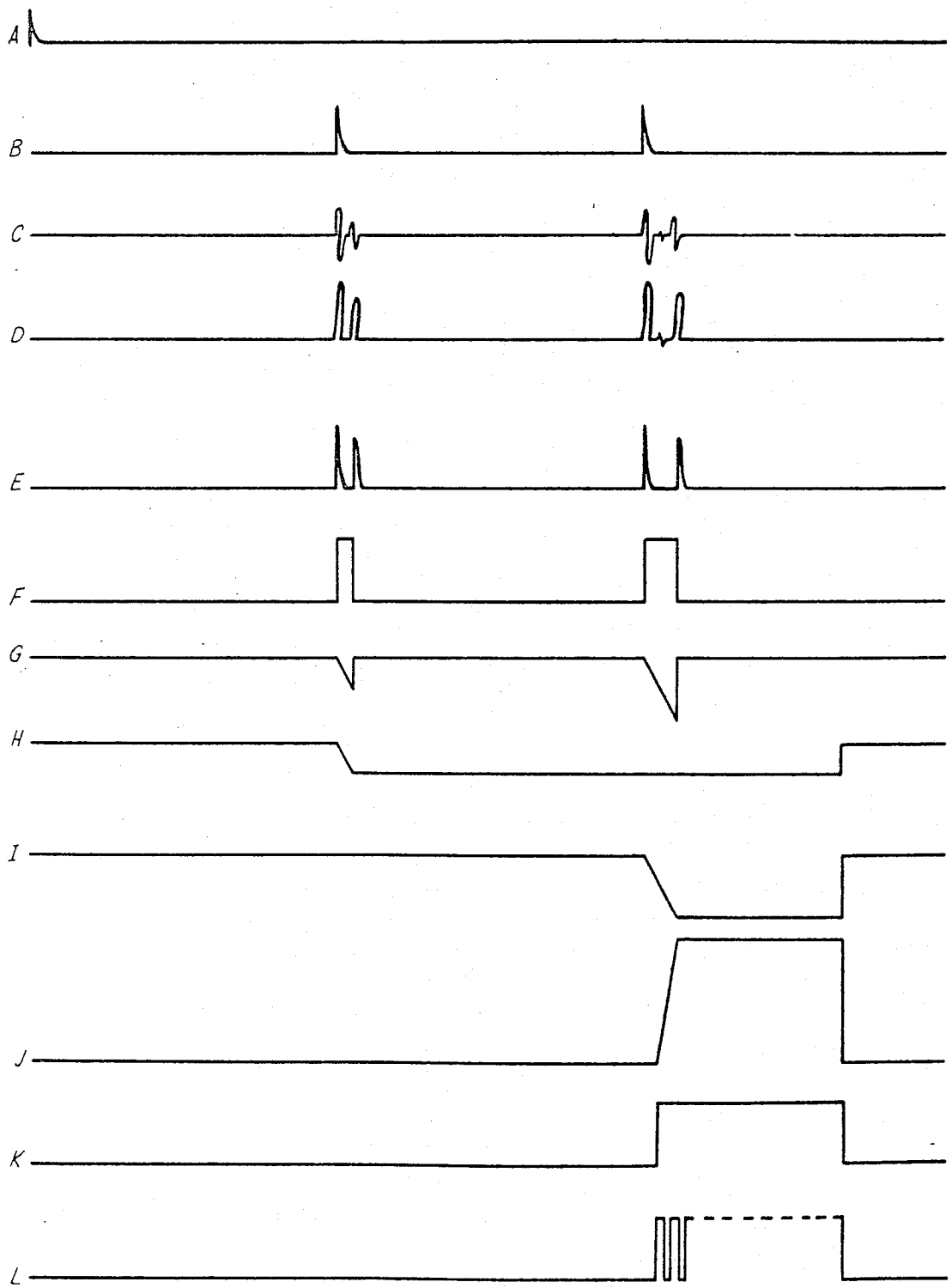
FIG. 2 is a graph illustrating the various wave forms taken at various points in FIG. 1.

A synchronizing pulse is provided by set synchronizing circuit 44, illustrated as FIG. 2A. The synchronizing pulse is applied to flip-flop 40, flip-flop 48, and to analog-to-digital converter 50. The synchronizing pulse is delayed by some predetermined amount such as 10 milliseconds in analog-to-digital converter 50 and applied to main synchronizing generator 34 from set synchronizing generator 44. Transmitting pulser 32 is actuated by the output of main synchronizing pulse generator 34. Simultaneously, the output signal from main synchronizing pulse generator 34 is applied to flip-flop 40. A signal from main synchronizing pulse generator 34, illustrated by FIG. 2B, is applied to gated amplifier 46, opening the gate to enable amplification of signals applied to the signal input from receiver and detector 42. As illustrated in FIG. 2B, the initial pulse from main synchronizing generator 34 is delayed 10 milliseconds after the set synchronizing pulse of FIG. 2A from set synchronizing generator 44. In addition, a second pulse is generated by main synchronizing pulse generator 34 in each cycle of operation in response to each pulse generated by set synchronizing generator 44. The first pulse of waveform 2B from main synchronizing pulse generator 34 is employed to generate an ultrasonic pulse by transducer 24 to be reflected from entrant surface 14 back to transducer 24. The second pulse is also employed to generate an ultrasonic pulse by transducer 24, which is reflected from back surface 16 to transducer 26.

The transmitter pulser 32 applies a large high-voltage pulse to transducer 24, causing transducer 24 to vibrate at an ultrasonic frequency, transmitting an ultrasonic pulse into the workpiece 12. The ultrasonic pulse generated by transducer 24 is delayed in space 28 before reaching entrant surface 14 of workpiece 12. A portion of the transmitted energy is reflected from entrant surface 14 back to transducer 24 through space 28. Transducer 24 converts the ultrasonic pulse back into an electrical signal, which is applied to input selector gate 38. Flip-flop 40 at this time is in a state opening the upper gate of input selector gate 38. The received signal, illustrated by the first signal of FIG. 2C, passes through input selector gate 38 to receiver and detector 42, where it is amplified and passed through a detector circuit. The detected signal, illustrated in FIG. 2D is applied to gated amplifier 46, which has been opened by the main pulse from synchronizing pulse generator 34. The output signal from gated amplifier 46, having the form illustrated in FIG. 2E, is applied to flip-flop 48. The signal from gated amplifier 46 comprises a first pulse at the time of the transmitted pulse and a second pulse, delayed by the flight time back and forth through space 28 reflected from the entrant surface 14. The first pulse sets flip-flop 48, while the second pulse resets it, resulting in a rectangular output signal, illustrated in FIG. 2F, having a time duration equal to the two-way flight time through space 28. This rectangular signal is applied to ramp generator 52. The ramp generator 52 is started by the leading edge of the square wave from flip-flop 48, and is stopped by the trailing edge when flip-flop 48 is reset, as illustrated in FIG. 2G. As a result, the voltage amplitude reached by the triangular wave of FIG. 2G is directly proportional to the length of rectangular wave 2F and is directly proportional to the time period between the time the transmitted pulse is launched and the time the reflected pulse from entrant surface 14 is received by transducer 24. Thus, it will be apparent that the voltage amplitude reached by the signal of FIG. 2G is directly proportional to the time required for the ultrasonic pulse to be propagated from transducer 24 through the space 28, reflected from entrant surface 14, and back through space 28 to transducer 24.

Output selector gates 54 are controlled by flip-flop 40. The triangular wave signal of FIG. 2G is connected by output selector gate 54 to "T" peak detector 56. "T" peak detector 56 provides an output voltage level directly proportional to the peak voltage of the ramp signal of FIG. 2G. The output of "T" peak detector 56 is illustrated by FIG. 2H. The output voltage from "T" peak detector 56 is applied to difference amplifier 58.

The second pulse produced by main synchronizing pulse generator 34 is applied to transmitter pulser 32 and to gated amplifier 46. The pulse causes transmitter pulser 32 to generate a large pulse which is applied to transmitting transducer 24. In the same manner discussed previously, transducer 24 generates an ultrasonic pulse in response to the actuating pulse from the pulser 32. The ultrasonic pulse from transducer 24 traverses space 28 and enters workpiece 12.

The pulse from main synchronizing generator 34 was also applied to flip-flop 40 which is reset and actuates input selector gates 38 so that a signal from transducer 26 will pass through input selector gate 38 to receiver and detector 42. The ultrasonic pulse from transducer 24 is reflected from the back surface 16 of the workpiece 12, traveling through passage 30 to transducer 26. Transducer 26 converts the reflected ultrasonic pulse to an electrical signal illustrated in FIG. 2C. The second transmitted pulse, and the pulse received by transducer 26 from rear surface 16, delayed by the flight time through space 28 and 30, are applied to receiver and detector 42. The signals are amplified and detected, and applied to gated amplifier 46. As illustrated in FIG. 2E, the gated amplifier 46 provides two pulses corresponding to the transmitted pulse and the reflected pulse received by transducer 26. These two pulses are then applied to flip-flop 48. As discussed hereinabove, flip-flop 48 generates a rectangular wave having a leading edge coinciding with the transmitted pulse and a trailing edge coinciding with the received pulse, as illustrated by FIG. 2F. The rectangular wave is applied to ramp generator 52. As in the case of the signal reflected from the entrant surface, ramp generator 52 generates a triangular wave having a peak amplitude directly proportional to the width of the rectangular wave of FIG. 2F. The second triangular wave of FIG. 2G has a greater amplitude than the first, since the second rectangular wave is longer due to the additional flight time of the ultrasonic pulse between entrant surface 14 and back surface 16. The second triangular wave passes through output selector gates 54 to "R" peak detector 60. The output selector gates 54 are operated in coincidence with input selector gates 38 by flip-flop 40, which has been reset by the pulse from main synchronizing pulse generator 34.

"R" peak detector 60 operates in a manner similar to "T" peak detector 56, generating a voltage directly proportional to the amplitude of the ramp voltage from ramp generator 52. The two voltages, from "T" peak detector 56 and from "R" peak detector 60, illustrated by FIGS. 2H and 2I, respectively, are applied to difference amplifier 58, wherein they are subtracted from one another. The output voltage, proportional to the difference between the outputs of the two pulse detectors 56 and 60, is inverted by difference amplifier 58, as illustrated in FIG. 2J. This voltage is applied to A–D converter 50. A–D converter 50 generates a rectangular wave having a duration proportional to the amplitude of the DC voltage applied thereto from difference amplifier 58. The rectangular output voltage from A–D converter 50 is applied to a clock 62. The clock 62 is a constant-frequency oscillator which is started tarted by the leading edge of the output rectangular wave voltage from A–D converter 50, and is stopped by the termination of the rectangular wave signal from A–D converter 50. The number of cycles of clock 62 may be counted by a digital counter 64, calibrated in terms of thickness of the workpiece 12. Alternatively or simultaneously, the voltage from clock 62 may be applied to a cathode-ray oscilloscope 66, which may conveniently have a calibrated screen.

The rectangular wave from A–D converter 50 is also applied to "T" peak detector 56 and "R" peak detector 60. The termination of the trailing edge of the rectangular wave from A–D converter 50 resets "T" peak detector 56 and "R" peak detector 60 thereby causing difference amplifier 58 to return to 0.

The termination of the signal from A-D converter 50 also stops clock 62, leaving the count in digital counter 64 representative of the thickness of the workpiece. A-D converter 50 is then reset by the set synchronizing generator 44, which in turn provides the synchronizing pulse to main synchronizing pulse generator 34, delayed 10 milliseconds, as set forth hereinabove.

In order to utilize the present tester 10 for measuring the thickness of the workpiece 12, the search unit 20 is placed on the entrant surface 14 of workpiece 12. The synchronizing circuit 44 produces a series of clock or timing pulses as shown in FIG. 2A. When the synchronizing pulse occurs, the flip-flop 40, the input and output selector gates 38 and 54 are set and the A-D converter 50 is cleared.

After a predetermined time delay, exemplarily 10 milliseconds, a trigger pulse is coupled from the A-D converter 50 to the main synchronizing pulse generator 34. This in turn will cause a pair of pulses (FIG. 2B) to be applied to the transmitter-pulser 32, the flip-flop 40 and the gated amplifier 46.

Each of these electrical pulses will cause the transducer 24 to transmit a corresponding pulse of ultrasonic energy through passage 28 to the workpiece 12. A portion of each pulse of this energy is reflected from the front face 14 back to the transducer 24 whereby an electrical signal is created. This signal is delayed from the transmitted electrical pulse by the flight time of the energy through passage 28 and return.

The remaining portion of the energy in each of the ultrasonic pulses is coupled through entrant surface 14 to the rear surface 16 from whence it is reflected back to the transducer 26. This transducer in turn produces corresponding electrical signals. These signals are delayed from the main transit electrical signal by the flight time of the ultrasonic energy from the transducer 24, through passage 28, through the workpiece and return and then through passage 30.

When the first transmitted pulse (FIG. 2B) occurs the lower portions of gate 38 is CLOSED and the upper portion is OPEN. Therefore, the back surface echo signal from transducer 26 is blocked by the gates 38. However, the front surface echo signal from transducer 24 is coupled through the gate 38, receiver-detector 42 and to the gated amplifier 46. The flip-flop 48, therefore, produces a square wave (FIG. 2F) having a width corresponding to the flight through passage 28 and return.

This square wave turns the ramp generator or integrator 52 ON whereby a sawtooth wave (FIG. 2G) is generated. The sawtooth wave is then directed through gate 54 to peak detector 56 where it is stretched (FIG. 2H) and fed to one side of the difference amplifier 58.

When the next pulse in FIG. 2B occurs the pulser 32 energizes the transducer 24. At the same time the gated amplifier 46 is activated and flip-flop 40 reverses gates 38 and output select gates 54. The pulse of ultrasonic energy from transducer 24 is transmitted through passage 28. A portion of this energy is reflected back to transducer 24 from the interface 14 and part is reflected back to transducer 26 from the back side 16. Since the upper portion of gates 38 is CLOSED the signal from transducer 24 does not pass therethrough. However, since the bottom part of the gate 38 is OPEN the signal from transducer 26 passes through the detector 42, gated amplifier 46 to flip-flop 48. The flip-flop 48 is then reversed whereby the second square wave (FIG. 2F) is formed. The duration of this square wave is equal to the flight time for the ultrasonic pulse to travel from transducer 24 to back side 16 to transducer 26. The square wave activates the integrator, or ramp generator 52, whereby the second sawtooth of FIG. 2G is formed. The amplitude of this sawtooth wave is a function of the duration of the square wave.

Since the flip-flop 40 has reversed the gate 54 the sawtooth is coupled through gate 54 to the peak detector 60 where it is stretched, as illustrated at FIG. 2I. The stretched signal is in turn coupled to the second side of the difference amplifier 58, where the difference between the two signals is determined. This difference signal is then fed through the A-D converter 50 so as to activate the clock 62. The resultant clock pulses are then fed to the digital counter 64 and/or cathode-ray tube 66, whereby the thickness of the workpiece is indicated.

I claim:

1. An ultrasonic testing device including:
   a search unit being adapted to engage the entrant surface of a workpiece;
   a first and second transducer being disposed in said search unit;
   a transmitter being coupled to said first transducer;
   a receiver being coupled to said second transducer;
   gating means for alternately coupling said receiver to said first and to said second transducer;
   a function generator coupled to transmitter and to said receiver adapted to produce a first voltage and a second voltage, said first voltage being a function of a first time interval indicative of the time between the transmission of a pulse produced by said first transducer and the receipt of an echo pulse by said first transducer, said second voltage being a function of a second time interval indicative of the time between the transmission of a pulse produced by said second transducer and the receipt of an echo pulse by said second transducer; and
   difference means coupled to said function generator for producing an output signal being a function of the difference between said first and second time interval.

2. The testing device as defined in claim 1 and further including:
   first and second voltage-responsive means; and
   means for alternately coupling said first and second voltage-responsive means to said function-generating means, said first voltage-responsive means producing a second output signal in response to said second voltage.

3. The testing device as defined in claim 2 and further including analog-to-digital converter for producing a digital signal indicative of the thickness of the workpiece.

4. The combination of
   a pulser,
   a transmitter coupled to said pulser for transmitting at least a first and a second signal on each pulse from said pulser,
   a search unit having a first transducer and a second transducer, said first transducer being coupled to the transmitter and responsive to the signals therefrom to transmit ultrasonic energy into a workpiece and to receive said ultrasonic energy returned from the entrant surface of said workpiece, said second transducer being adapted to receive the energy transmitted by said transmitter and returned from the rear surface of said workpiece,
   a receiver,
   an input selector circuit having a first input circuit coupled to said first transducer, a second input circuit coupled to said second transducer and an output circuit coupled to said receiver,
   first means coupled to said input selector circuit and responsive to said transmitter for enabling said selector circuit to pass the signals from said transmitter and the first transducer of said search unit on the first signal from said transmitter and for enabling said selector circuit to pass the signals from said first transmitter and return signals from said second transducer of said search unit on the second pulse from said transmitter,
   a linear ramp signal generator adapted to generate a linear ramp signal during the time a signal is applied thereto;
   second means coupled to said receiver and to said ramp signal generator for alternately passing signals to said linear ramp signal generator and enabled by the time durations between pulses received by said receiver,
   output means coupled to said linear ramp signal generator for providing a signal indicative of comparison of alternate signals received therefrom,
   an output selection circuit operable with said input selection circuit and having an input circuit coupled to said linear ramp signal generator and a first output circuit and a second output circuit, a first peak detector coupled to the first output circuit of said output selection circuit and including an output circuit, a second peak detector coupled to the second output circuit of said output selection circuit and including an output circuit, and a difference amplifier coupled to the output circuits of said first and second peak detectors.

5. The combination of claim 4 wherein said first means and said second means are flip-flops.

* * * * *